United States Patent
Zhang et al.

(10) Patent No.: US 11,940,991 B2
(45) Date of Patent: Mar. 26, 2024

(54) DATA HOLES IN A TIME SERIES DATABASE

(71) Applicant: International Business Machines Corporation, Armonk, NY (US)

(72) Inventors: Huai Long Zhang, Chang Ping district (CN); Peng Hui Jiang, Beijing (CN); Jin Shan Li, Beijing (CN); Rui Liu, Beijing (CN); Ming Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 17/207,818

(22) Filed: Mar. 22, 2021

(65) Prior Publication Data

US 2022/0300485 A1 Sep. 22, 2022

(51) Int. Cl.
*G06F 16/23* (2019.01)
*G06F 16/22* (2019.01)
*G06F 16/28* (2019.01)

(52) U.S. Cl.
CPC ...... *G06F 16/2379* (2019.01); *G06F 16/2228* (2019.01); *G06F 16/288* (2019.01)

(58) Field of Classification Search
CPC .............................................. G06F 2212/7205
See application file for complete search history.

(56) References Cited

U.S. PATENT DOCUMENTS

| | | | |
|---|---|---|---|
| 8,046,551 B1* | 10/2011 | Sahin | G06F 12/0866 714/707 |
| 9,830,111 B1* | 11/2017 | Patiejunas | G06F 3/0625 |
| 11,048,759 B1* | 6/2021 | Pope | G06F 40/295 |
| 11,314,416 B1* | 4/2022 | Shveidel | G06F 3/0611 |
| 2007/0061546 A1* | 3/2007 | Berger | H03M 7/30 711/202 |
| 2015/0095381 A1 | 4/2015 | Chen | |
| 2016/0092484 A1 | 3/2016 | Finkler | |
| 2017/0329541 A1* | 11/2017 | Hayasaka | G06F 12/0811 |
| 2018/0039651 A1* | 2/2018 | Tobin | G06F 16/2428 |
| 2019/0050453 A1 | 2/2019 | Duffield | |
| 2020/0167361 A1 | 5/2020 | Princehouse | |
| 2020/0285617 A1 | 9/2020 | Tobin | |
| 2021/0034571 A1* | 2/2021 | Bedadala | G06F 16/2379 |

FOREIGN PATENT DOCUMENTS

| | | |
|---|---|---|
| CN | 106874343 A | 6/2017 |
| CN | 108399263 A | 8/2018 |

\* cited by examiner

*Primary Examiner* — Richard L Bowen
(74) *Attorney, Agent, or Firm* — Gavin Giraud

(57) ABSTRACT

An indication to remove one or more data in a time series database is received. A metadata index associated with the time series database is updated to indicate a soft removal of each data of the one or more data. A data hole index associated with the time series database is updated to indicate a data hole at a location of each data of the one or more data in the time series database. Responsive to an input/output rate for the time series database being below a threshold, the data hole of each data of the one or more data is optimized.

20 Claims, 3 Drawing Sheets

DATA HOLES IN A TIME SERIES DATABASE

BACKGROUND

The present invention relates generally to the field of time series databases, and more particularly to using data holes in time series databases.

A time series database is a database that stores and serves time series data through associated pairs of time(s) and value(s). Time-series data allows for the collection of data point over time intervals in order to track changes over time. This allows the measurements or events to be tracked, monitored, down sampled, and aggregated over time. The timestamps provide context for each piece of data and how the datapoints are related to each other.

SUMMARY

Embodiments of the present invention disclose a computer-implemented method, a computer program product, and a system for managing a time series database. In one embodiment, an indication to remove one or more data in a time series database is received. A metadata index associated with the time series database is updated to indicate a soft removal of each data of the one or more data. A data hole index associated with the time series database is updated to indicate a data hole at a location of each data of the one or more data in the time series database. Responsive to an input/output rate for the time series database being below a threshold, the data hole of each data of the one or more data is optimized.

DETAILED DESCRIPTION

The present invention provides a method, computer program product, and computer system for utilizing data holes in time series databases. Embodiments of the present invention recognize that time series databases are more scalable than traditional databases and balance the ACID/BASE relationship by offering principles that suit time series databases. Embodiments of the present invention recognize that with time series databases it is common the request a summary of data over a large period of time and this requires analyzing a range of data points to perform some computations. For example, a percentile increase this month of a metric over the same period in the last six months, summarized by month. Embodiments of the present invention recognize with time series databases, it is common to keep high precision data around for shorter periods of time and then this data is aggregated and down sampled into longer term trend data. This means that for every data point that goes into the time series database, the data point will be delete after its period of time is up. Embodiments of the present invention recognize that this data lifecycle management is difficult for developers to implement on top of regular database.

Embodiments of the present invention recognize that there are many benefits to using time series databases, however with the growth of data it may be necessary to delete periodically some data that is either not used any more and/or garbage data. Embodiments of the present invention recognize that data holes will be created in the time series database by the removal of this data. Embodiments of the present invention recognize it is beneficial to reuse these data holes to achieve additional storage and/or read/write benefits.

Figure 1:
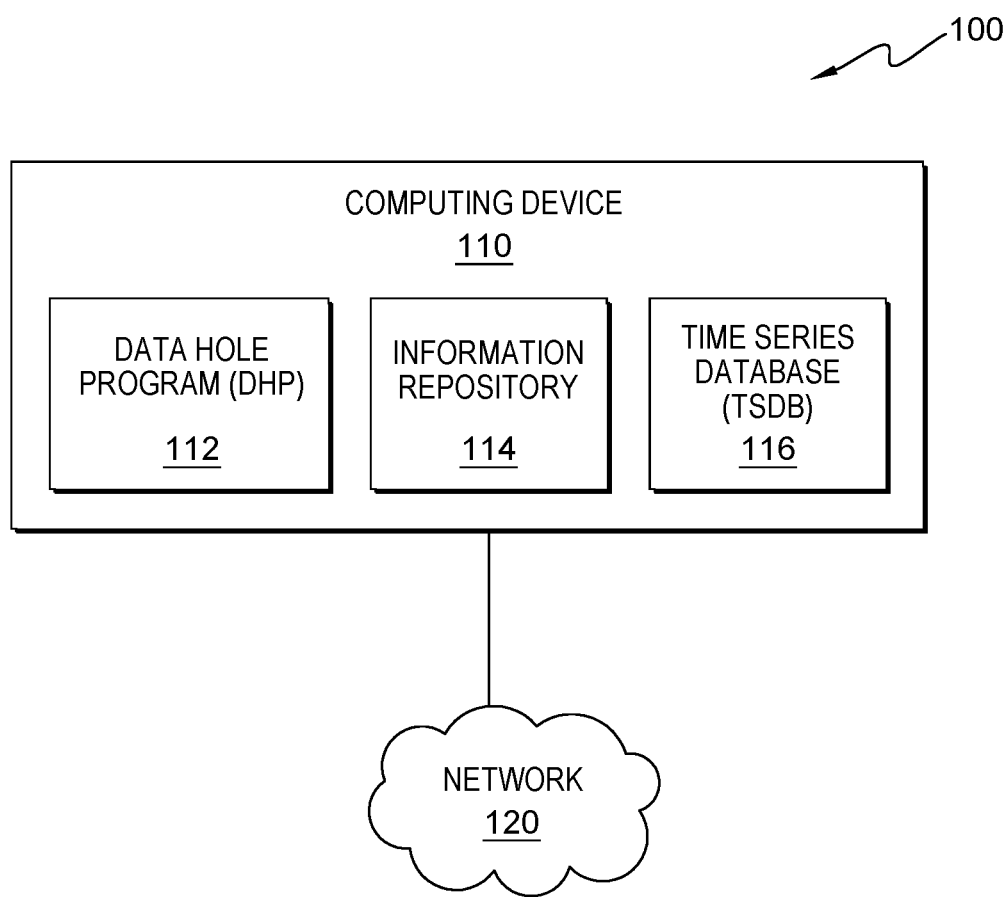
FIG. 1 is a functional block diagram of a network computing environment, generally designated 100, suitable for operation of data hole program 112, in accordance with at least one embodiment of the invention.

Referring now to various embodiments of the invention in more detail, FIG. 1 is a functional block diagram of a network computing environment, generally designated 100, suitable for operation of data hole program (DHP) 112 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In various embodiments of the invention, computing device 110 includes DHP 112, information repository 114, and time series database (TSDB) 116.

In an embodiment, computing device 110 includes DHP 112. Embodiments of the present invention provide for a DHP 112 that determines a data removal request. Embodiments of the present invention provide for a DHP 112 that update a data hole index. Embodiments of the present invention provide for a DHP 112 that optimize the data holes. Embodiments of the present invention provide for a DHP 112 that receive data hole write requests. Embodiments of the present invention provide for a DHP 112 that determines whether there is a data hole that fits the need. Embodiments of the present invention provide for a DHP 112 that creates new data files. Embodiments of the present invention provide for a DHP 112 that write data to data holes. Embodiments of the present invention provide for a DHP 112 that optimize the data holes.

In an embodiment, computing device 110 includes information repository 114. In an embodiment, information repository 114 may be managed by DHP 112. In an alternative embodiment, information repository 114 may be managed by the operating system of computing device 110, another program (not shown), alone, or together with, DHP 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. In an embodiment, some information found in information repository 114 may be found in TSDB 116. Information repository 114 may include, but is not limited to, the data hole index, metadata index, I/O threshold, data hole hit rate of cache data, usage of data in data hole, usage model, user profile, retention plan, deletion method, etc. In alternative embodiment, data hole index and metadata index may be stored directly in TSDB 116. In an embodiment, the data hole index includes the start location of the data hole(s), the size of the data hole(s), and each data hole(s) set "locked" to false for the data hole(s) to save for further use later. In an embodiment, the metadata index includes the location of data in TSDB 116.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, computing device 110 includes TSDB 116. Embodiments of the present invention provide for a TSDB 116 that is a database system that is optimized to store data in time-stamped or time series. In an embodiment, TSDB 116 does this using associated pairs of time(s) and value(s). Time series data is measurements or events that are tracked, monitored, down-sampled, and aggregated over time. In an embodiment, TSDB 116 includes a plurality of shards and each shard includes a plurality of data blocks (L1, L2, L3, etc.) In an embodiment, TSDB 116 may include data hole index and/or metadata index in TSDB 116.

Figure 2:
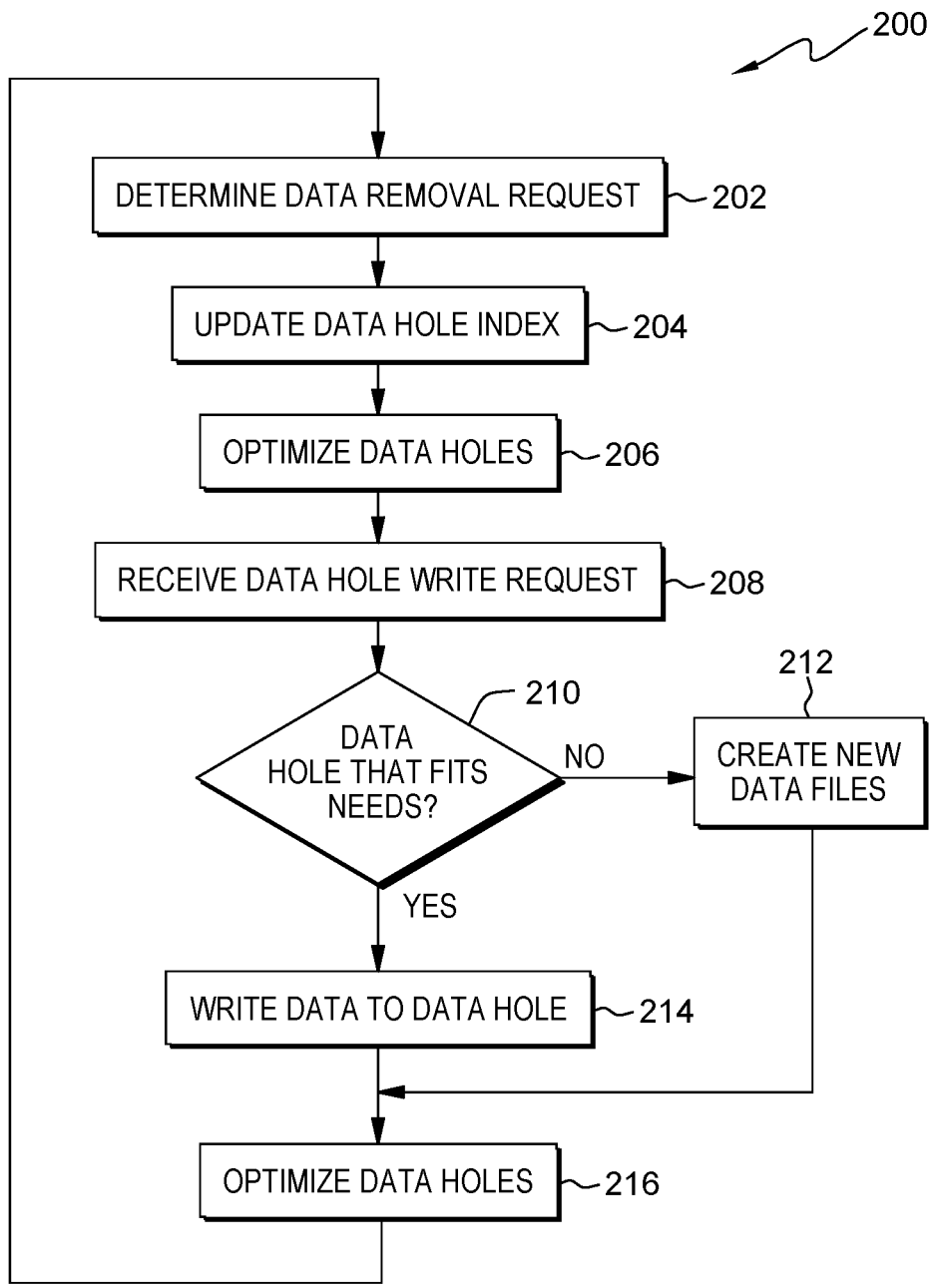
FIG. 2 is a flow chart diagram depicting operational steps for data hole program 112 for managing a time series database, in accordance with at least one embodiment of the invention.

FIG. 2 is a flow chart diagram of workflow 200 depicting operational steps for DHP 112 in accordance with at least one embodiment of the invention. In an alternative embodiment, the steps of workflow 200 may be performed by any other program while working with DHP 112. It should be appreciated that embodiments of the present invention provide at least for managing data holes in time series databases. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting DHP 112 to manage data holes in TSDB 116. In an embodiment, TSDB 116 already contains, in other words has stored, a plurality of time series data.

DHP 112 determines data removal request (step 202). At step 202, DHP 112 determines that a piece or series of time series date, stored in TSDB 116, has been indicated for data removal. In an embodiment, this indication may come from a user, via the user interface discussed above. In an alternative embodiment, this indication may be time based. In other words, a series of data may be down sampled or averaged after a period of time. For example, we have multiple locations to record the highest temperature during the day. In this example, the highest temperature of location A (Building A) is determined and stored each day. However, the location to determine the highest temperature is changed to location B (Building B). The data for location A (Building A) is requested to be removed in a data removal request. In an embodiment, when data is removed from TSDB 116, DHP 112 and/or TSDB 116 update the metadata index found in TSDB 116 by performing a "soft removal" by indicating the location of the removed data as empty in the metadata index. In other words, by indicating the removed data as a data hole. In an embodiment, when data is removed from TSDB 116, DHP 112 and/or TSDB 116 update the data hole index by indicating the location of the removed data as empty in the data hole index. In other words, by indicating the removed data as a data hole.

DHP 112 updates the data hole index (step 204). At step 204, DHP 112 updates the data hole index for the data that is removed in the data removal request of step 202. In an embodiment, the data hole index is updated to set a "locked" flag to false for the data hole, in other words the location of the removed data in the data removal request of step 202.

Additionally, in an embodiment, the data hole index is also updated to include the start location of the data hole, in other words the start location of the removed data, and the size of the data hole, in other words the size of the data hole.

DHP 112 optimizes data holes (step 206). At step 206, DHP 112 whether the TSDB 116 input/output rate is below a I/O threshold. In other words, DHP 112 optimizes data holes in TSDB 116 when TSDB 116 is doing low amounts of work, in other words when the input/output rate of the TSDB 116 is below an I/O threshold. This provides for less impacts on performance of the TSDB 116 during normal operation. In an embodiment, the I/O threshold may be input by a user. In an embodiment, DHP 112 optimizes data holes within the same shard. In an embodiment, to enhance the efficiency, we use a data hole in same shard. Because each shard has hundreds or more files, each time the whole shard needs to be traversed to find the data before we use data hole. In an embodiment, if a data hole is used, the data hole may at the very beginning of the files, and the data is quicker and easier to locate. In an embodiment, there is no limitation on the shard time interval.

Upon optimization of the data holes, DHP 112 and/or TSDB 116 may update the min-time and max-time for the data file based upon the optimization of the data holes.

In a first embodiment, DHP 112 may optimize data holes by moving data holes in the same data file of a shard. In this first embodiment, DHP 112 may move one or more holes to create a hole that is larger than any of the original one or more holes. For example, DHP 112 may move a smaller first data hole in a first data file adjacent to a larger second data hole in a first data file to create a data hole in the first data file that is larger than both the first data hole and the second data hole. In an embodiment, when the data hole is moved other data files are also moved.

In a second embodiment, DHP 112 may optimize data holes by moving data holes in multiple data files of a shard. In this second embodiment, DHP 112 may move one or more holes to create a hole that is larger than any of the original one or more holes. For example, DHP 112 may move a smaller first data hole in a first data file adjacent to a larger second data hole in a second data file to create a data hole in the second data file that is larger than both the first data hole and the second data hole and remove the first date hole from the first data file.

DHP 112 receives a data hole write request (step 208). At step 208, DHP 112 receives a data write request to TSDB 116. In an embodiment, DHP 112 determines the size needed to store the data in the write request. In an embodiment, DHP 112 determines the data shard and/or data file to write the data in TSDB 116 using the metadata index. In an embodiment, DHP 112 determines the data holes that exist in the data shard and/or data file to write the data in TSDB 116 using the data hole index.

DHP 112 determines whether a data hole that fits the needs (decision step 210). In other words, at step 210, DHP 112 determines whether a data hole exists in a data shard from step 208 that can store the data write request of step 208. In an embodiment, DHP 112 will determine whether a data hole exists by analyzing the shard that the data write request is for. In an alternative embodiment, DHP 112 will determine whether a data hole exists by analyzing any shard that the data write request can be written in. In an embodiment, DHP 112 compares the size of the data write request to the size of the data hole. In an embodiment, if the size of the data write request is smaller than the size of the data hole (decision step 210, "yes" branch), processing proceeds to step 214. In an embodiment, if the size of the data write request is larger than the size of the data hole (decision step 210, "no" branch), processing proceeds to step 212.

DHP 112 creates new data files (step 212). At step 212, DHP 112 indicates to TSDB 116 to create new data files for the data write request of step 208. In an embodiment, DHP 112 and/or TSDB 116 create the new data files and store the data write request in the new data files in the next available location of TSDB 116. In an embodiment, DHP 112 and/or TSDB 116 updates the metadata index to indicate the location the new data files were written in TSDB 116.

DHP 112 writes data to data hole (step 214). At step 214, DHP 112 indicates to TSDB 116 to write the data files for the data write request of step 208 in the determine data holes of step 208. In an embodiment, DHP 112 and/or TSDB 116 store the data write request of step 208 in the data holes of the determined shard TSDB 116. In an embodiment, DHP 112 and/or TSDB 116 updates the data hole index to indicate the used up data hole that has stored data now and the metadata index to indicate the location the data files that were written to the data hole in TSDB 116.

DHP 112 optimizes data holes (step 216). In an embodiment, DHP 112 determines frequently accessed data found in TSDB 116 and moves the frequently accessed data to data holes. In an embodiment, frequently accessed data may also be called hot data. In an embodiment, hot data may be data that is queried more often than a query threshold. In an embodiment, the hot data may be data that is created by querying the TSDB 116 to read the raw data found in TSDB 116 and aggregate to generate the hot data result. In an embodiment, DHP 112 determines the size of the hot data and determines data holes that are the same size or larger than the size of the hot data. In an embodiment, DHP 112 moves the hot data to one or more of the data holes.

For example, in a TSDB 116 that includes the high temperature for every day of the year. In this example, the hot data may be an average high temperature for each month. Here, the average high temperature for each month may be frequently requested above the query threshold, therefore, DHP 112 determines it is hot data. DHP 112 determines the size of the data to store the average high temperature each month and then determines a data hole in TSDB 116 that is larger in size than the size of the data needed to be store. In an embodiment, DHP 112 then moves the hot data to the data hole.

Figure 3:
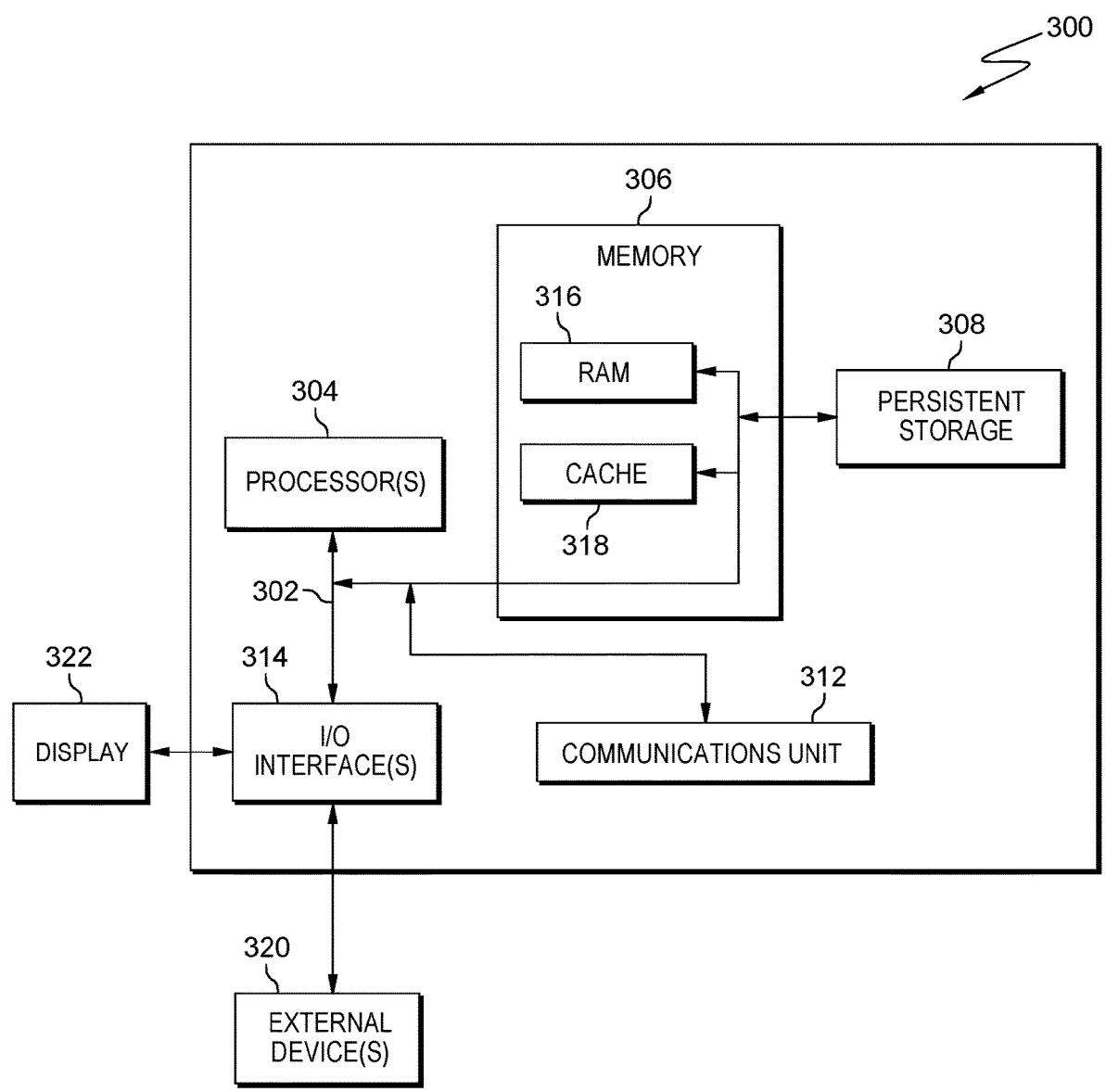
FIG. 3 is a block diagram depicting components of a computer, generally designated 300, suitable for data hole program 112, in accordance with at least one embodiment of the invention.

FIG. 3 is a block diagram depicting components of a computer 300 suitable for data hole program 112, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system.

For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for data hole program 112 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a time series database, the computer-implemented method comprising:
    receiving, by one or more computer processors, an indication to remove one or more data in a shard of a time series database;
    updating, by one or more computer processors, a metadata index associated with the time series database to indicate a soft removal of each data of the one or more data;
    updating, by one or more computer processors, a data hole index associated with the soft removal within the time series database to indicate a first data hole at a first location created in the time series database by the soft removal of a first data of the one or more data, wherein the first data hole may be located using the data hole index without traversing the shard; and
    responsive to an input/output rate for the time series database being below a threshold, filling, by one or more computer processors, the first data hole with data from a stored location within the shard that matches the size of the first data hole as determined from the metadata index, and storing the stored location as the first data hole in the data hole index.

2. The computer-implemented method of claim 1, wherein filling the first data hole comprises:
    moving, by one or more computer processors, the first data hole adjacent to a second data hole for a second data of the one or more data to create a combination data hole that is a size of the first data hole and the second data hole, wherein the first data hole and the second data hole are found in a same data file.

3. The computer-implemented method of claim 1, wherein filling the first data hole comprises:
    moving, by one or more computer processors, the first data hole adjacent to a second data hole for a second data of the one or more data to create a combination data hole that is a size of the first data hole and the second data hole, wherein the first data hole and the second data hole are not found in a same data file.

4. The computer-implemented method of claim 1, wherein the data hole index has a start location of a removed one or more data and a size of the removed one or more data for each removed data of the removed one or more data.

5. The computer-implemented method of claim 1, further comprising:
    receiving, by one or more computer processors, a data write request to the time series database;
    determining, by one or more computer processors, a size of the data write request;
    determining, by one or more computer processors, that a second data hole in the time series database is larger than the size of the data write request; and
    writing, by one or more computer processors, a data of the data write request to the second data hole in the time series database.

6. The computer-implemented method of claim 5, wherein the data hole in the time series database that is larger than the size of the data write request is in a same shard in the time series database.

7. The computer-implemented method of claim 1, further comprising:
    determining, by one or more computer processors, frequently accessed data, wherein the frequently accessed data has been queried more than a query threshold;
    determining, by one or more computer processors, that a second data hole in the time series database is larger than the size of a data that is determined to be frequently accessed data; and
    writing, by one or more computer processors, the data that is determined to be frequently accessed data to the second data hole.

8. A computer program product for managing a time series database, the computer program product comprising:

one or more computer readable storage media; and
program instructions stored on the one or more computer readable storage media, the program instructions comprising:
    program instructions to receive an indication to remove one or more data in a shard of a time series database;
    program instructions to update a metadata index associated with the time series database to indicate a soft removal of each data of the one or more data;
    program instructions to update a data hole index associated with the soft removal within the time series database to indicate a first data hole at a first location created in the time series database by the soft removal of a first data of the one or more data, wherein the first data hole may be located using the data hole index without traversing the shard; and
    program instructions, responsive to an input/output rate for the time series database being below a threshold, to fill the first data hole with data from a stored location within the shard that matches the size of the first data hole as determined from the metadata index, and store the stored location as the first data hole in the data hole index.

9. The computer program product of claim 8, wherein the program instructions to fill the data hole comprise program instructions to:
    move the first data hole adjacent to a second data hole for a second data of the one or more data to create a combination data hole that is a size of the first data hole and the second data hole, wherein the first data hole and the second data hole are found in a same data file.

10. The computer program product of claim 8, wherein the program instructions to fill the data hole comprise program instructions to:
    move the first data hole adjacent to a second data hole for a second data of the one or more data to create a combination data hole that is a size of the first data hole and the second data hole, wherein the first data hole and the second data hole are not found in a same data file.

11. The computer program product of claim 8, wherein the data hole index has a start location of a removed one or more data and a size of the removed one or more data for each removed data of the removed one or more data.

12. The computer program product of claim 8, further comprising one or more of the following program instructions, stored on the one or more computer readable storage media, to:
    receive a data write request to the time series database;
    determine a size of the data write request;
    determine that a second data hole in the time series database is larger than the size of the data write request; and
    write a data of the data write request to the second data hole in the time series database.

13. The computer program product of claim 12, wherein the data hole in the time series database that is larger than the size of the data write request is in a same shard in the time series database.

14. The computer program product of claim 8, further comprising one or more of the following program instructions, stored on the one or more computer readable storage media, to:
    determine frequently accessed data, wherein the frequently accessed data has been queried more than a query threshold;
    determine that a second data hole in the time series database is larger than the size of a data that is determined to be frequently accessed data; and
    write the data that is determined to be frequently accessed data to the second data hole.

15. A computer system for managing a time series database, the computer system comprising:
    one or more computer processors;
    one or more computer readable storage media; and
    program instructions, stored on the one or more computer readable storage media for execution by at least one of the one or more computer processors, the program instructions comprising:
        program instructions to receive an indication to remove one or more data in a shard of a time series database;
        program instructions to update a metadata index associated with the time series database to indicate a soft removal of each data of the one or more data;
        program instructions to update a data hole index associated with the soft removal within the time series database to indicate a first data hole at a first location created in the time series database by the soft removal of a first data of the one or more data, wherein the first data hole may be located using the data hole index without traversing the shard; and
        program instructions, responsive to an input/output rate for the time series database being below a threshold, to fill the first data hole with data from a stored location within the shard that matches the size of the first data hole as determined from the metadata index, and store the stored location as the first data hole in the data hole index.

16. The computer system of claim 15, further comprising one or more of the following program instructions, stored on the one or more computer readable storage media for execution by at least one of the one or more computer processors, to:
    move the first data hole adjacent to a second data hole for a second data of the one or more data to create a combination data hole that is a size of the first data hole and the second data hole, wherein the first data hole and the second data hole are found in a same data file.

17. The computer system of claim 15, further comprising one or more of the following program instructions, stored on the one or more computer readable storage media for execution by at least one of the one or more computer processors, to:
    move the first data hole adjacent to a second data hole for a second data of the one or more data to create a combination data hole that is a size of the first data hole and the second data hole, wherein the first data hole and the second data hole are not found in a same data file.

18. The computer system of claim 15, wherein the data hole index has a start location of a removed one or more data and a size of the removed one or more data for each removed data of the removed one or more data.

19. The computer system of claim 15, further comprising one or more of the following program instructions, stored on the one or more computer readable storage media for execution by at least one of the one or more computer processors, to:
    receive a data write request to the time series database;
    determine a size of the data write request;
    determine that a second data hole in the time series database is larger than the size of the data write request; and write a data of the data write request to the second data hole in the time series database.

20. The computer system of claim 15, further comprising one or more of the following program instructions, stored on the one or more computer readable storage media for execution by at least one of the one or more computer processors, to:

determine frequently accessed data, wherein the frequently accessed data has been queried more than a query threshold;

determine that a second data hole in the time series database is larger than the size of a data that is determined to be frequently accessed data; and write the data that is determined to be frequently accessed data to the second data hole.

* * * * *